US012782923B2

(12) United States Patent
Condessa et al.

(10) Patent No.: US 12,782,923 B2
(45) Date of Patent: Nov. 3, 2026

(54) SYSTEM AND METHOD WITH SEQUENCE MODELING OF SENSOR DATA FOR MANUFACTURING

(71) Applicant: Robert Bosch GmbH, Stuttgart (DE)

(72) Inventors: Filipe Condessa, Pittsburgh, PA (US); Devin Willmott, Pittsburgh, PA (US); Ivan Batalov, Pittsburgh, PA (US); Joao Semedo, Pittsburgh, PA (US); Zhichun Huang, Pittsburgh, PA (US); Wan-Yi Lin, Wexford, PA (US); Bahare Azari, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 985 days.

(21) Appl. No.: 18/067,432

(22) Filed: Dec. 16, 2022

(65) Prior Publication Data

US 2024/0201669 A1 Jun. 20, 2024

(51) Int. Cl.
*G05B 19/418* (2006.01)
*G06N 3/045* (2023.01)

(52) U.S. Cl.
CPC ......... *G05B 19/4184* (2013.01); *G06N 3/045* (2023.01)

(58) Field of Classification Search
CPC .... G05B 19/4184; G06N 3/045; G06N 3/044; G06N 3/0442; G06N 3/0464; G01D 21/02; G06Q 10/04; G06Q 10/20
See application file for complete search history.

(56) References Cited

U.S. PATENT DOCUMENTS

2020/0082546 A1* 3/2020 Cui .......................... G01S 17/66
2020/0094405 A1* 3/2020 Davidson ............... B25J 9/1669
(Continued)

OTHER PUBLICATIONS

Kanawaday et al., "Machine Learning for Predictive Maintenance of Industrial Machines using IoT Sensor Data," 2017 8th IEEE International Conference on Software Engineering and Service Science (ICSESS), Nov. 24-26, 2017, DOI: 10.1109/ICSESS.2017.8342870, pp. 87-90.
(Continued)

*Primary Examiner* — Alexey Shmatov
*Assistant Examiner* — Devika S Maharaj
(74) *Attorney, Agent, or Firm* — Kathy Takeguchi; Maginot, Moore & Beck LLP

(57) ABSTRACT

A computer-implemented system and method includes establishing a station sequence that a given part traverses. A first neural network generates a set of parameter data based on observed measurement data of the given part at each station of a station subsequence. The set of parameter data is associated with a latent variable subsequence corresponding to the station subsequence. A second neural network generates next parameter data based on history measurement data and the set of parameter data. The history measurement data relates to another part processed before the given part and is associated with each station of the station sequence. The next parameter data is associated with a next latent variable that follows the latent variable subsequence. The next latent variable corresponds to a next station that follows the station subsequence in the station sequence. The second neural network generates predicted measurement data of the given part at the next station based on the next latent variable and the next parameter data.

20 Claims, 4 Drawing Sheets

(56) References Cited

U.S. PATENT DOCUMENTS

| | | | | |
|---|---|---|---|---|
| 2020/0379454 | A1 * | 12/2020 | Trinh | G06N 20/00 |
| 2025/0036947 | A1 * | 1/2025 | Zhang | G06N 3/045 |

OTHER PUBLICATIONS

Saadallah et al., "Early Quality Prediction using Deep Learning on Time Series Sensor Data," 55th CIRP Conference on Manufacturing Systems, ScienceDirect, Procedia CIRP vol. 107, 2022, pp. 611-616.

* cited by examiner

SYSTEM AND METHOD WITH SEQUENCE MODELING OF SENSOR DATA FOR MANUFACTURING

TECHNICAL FIELD

This disclosure relates generally to predictive maintenance, and more particularly to machine learning systems with sequence modeling for predictive monitoring of industrial machines and/or product parts.

BACKGROUND

An industrial manufacturing process may include a number of workstations with industrial machines, which are employed in a particular order to produce a particular product. For example, such industrial manufacturing processes are typically used in assembly plants. Unfortunately, there may be instances in which one or more industrial machines may fail to perform at satisfactory levels or may fail completely. Such machine failures may result in low grade products, incomplete products, and/or disruptions in the industrial manufacturing process, as well as major losses in resources, time, etc.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to predictive measurement monitoring. The method includes establishing a station sequence that includes a plurality of stations that a given part traverses. The method includes receiving, via a first neural network, observed measurement data regarding attributes of the given part as obtained by one or more sensors at each station of a station subsequence of the station sequence. The method includes generating, via the first neural network, a set of parameter data based on the observed measurement data. The set of parameter data being associated with a latent variable subsequence. The latent variable subsequence corresponds to the station subsequence. The method includes receiving, via a second neural network, history measurement data of another part that was processed before the given part. The history measurement data relates to attributes of the another part that are taken with respect to each station of the plurality of stations of the station sequence. The method includes generating, via the second neural network, next parameter data based on the history measurement data while using the set of parameter data. The next parameter data is associated with a next latent variable that follows the latent variable subsequence. The next latent variable corresponding to a next station that follows the station subsequence in the station sequence. The method includes generating, via the second neural network, predicted measurement data of the given part at the next station based on the next latent variable and the next parameter data.

According to at least one aspect, a system includes a processor and a memory. The memory is in data communication with the processor. The memory has computer readable data including instructions stored thereon that, when executed by the processor, cause the processor to perform a method for predictive measurement monitoring. The method includes establishing a station sequence that includes a plurality of stations that a given part traverses. The method includes receiving, via a first neural network, observed measurement data regarding attributes of the given part as obtained by one or more sensors at each station of a station subsequence of the station sequence. The method includes generating, via the first neural network, a set of parameter data based on the observed measurement data. The set of parameter data being associated with a latent variable subsequence. The latent variable subsequence corresponds to the station subsequence. The method includes receiving, via a second neural network, history measurement data of another part that was processed before the given part. The history measurement data relates to attributes of the another part that are taken with respect to each station of the plurality of stations of the station sequence. The method includes generating, via the second neural network, next parameter data based on the history measurement data while using the set of parameter data. The next parameter data is associated with a next latent variable that follows the latent variable subsequence. The next latent variable corresponding to a next station that follows the station subsequence in the station sequence. The method includes generating, via the second neural network, predicted measurement data of the given part at the next station based on the next latent variable and the next parameter data.

According to at least one aspect, a non-transitory computer readable medium having computer readable data including instructions stored thereon that, when executed by a processor, cause the processor to perform a method for predictive measurement monitoring. The method includes establishing a station sequence that includes a plurality of stations that a given part traverses. The method includes receiving, via a first neural network, observed measurement data regarding attributes of the given part as obtained by one or more sensors at each station of a station subsequence of the station sequence. The method includes generating, via the first neural network, a set of parameter data based on the observed measurement data. The set of parameter data being associated with a latent variable subsequence. The latent variable subsequence corresponds to the station subsequence. The method includes receiving, via a second neural network, history measurement data of another part that was processed before the given part. The history measurement data relates to attributes of the another part that are taken with respect to each station of the plurality of stations of the station sequence. The method includes generating, via the second neural network, next parameter data based on the history measurement data while using the set of parameter data. The next parameter data is associated with a next latent variable that follows the latent variable subsequence. The next latent variable corresponding to a next station that follows the station subsequence in the station sequence. The method includes generating, via the second neural network, predicted measurement data of the given part at the next station based on the next latent variable and the next parameter data.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
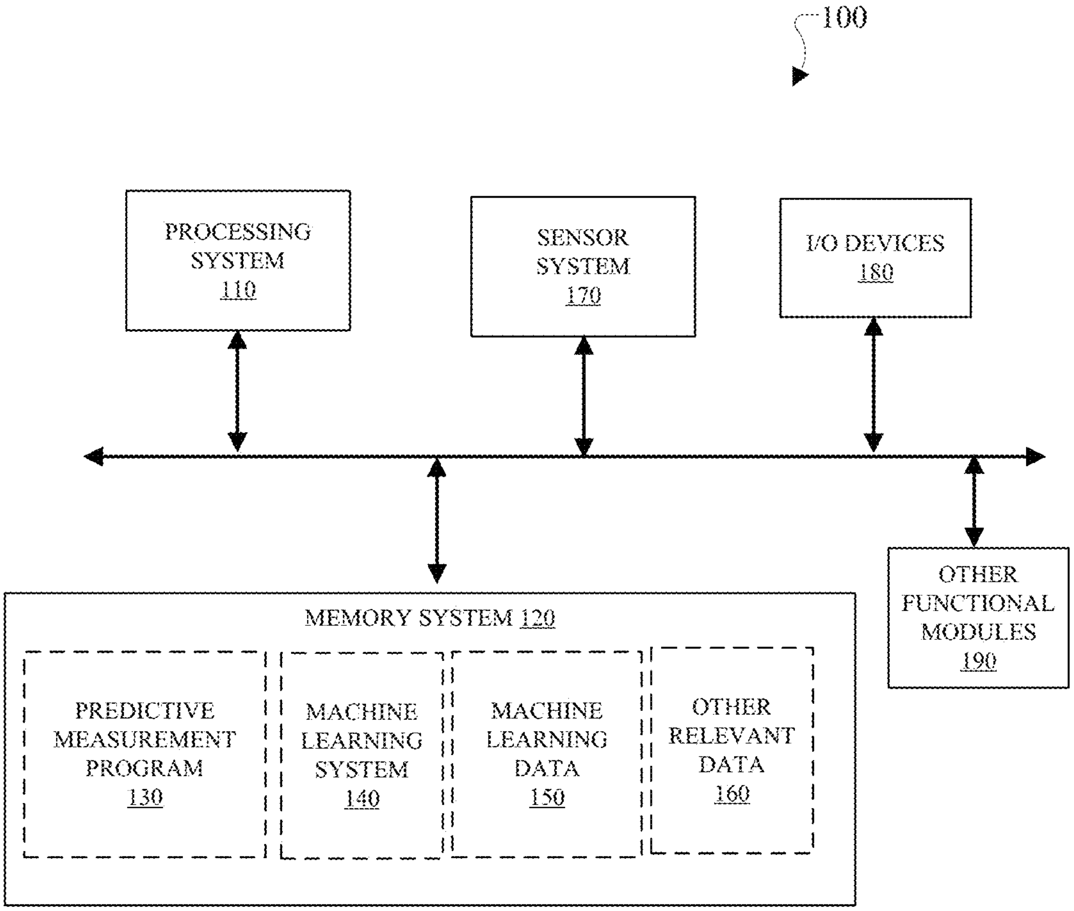
FIG. 1 is diagram of an example of a system for predictive measurement monitoring according to an example embodiment of this disclosure.

FIG. 1 is a diagram of a non-limiting example of a system 100, which is configured to predict future measurements of a particular part at a given station. The system 100 learns the dynamics of manufacturing time series. More specifically, the system 100 learns an appropriate representation of manufacturing data in a two-dimensional auto-regressive manner. This learned representation of manufacturing data is then used to perform various downstream tasks, such as future trend estimation of measurement data, as obtained by sensors, in manufacturing processes. The system 100 employs an approach, which differs from simple data-driven methods for time series sensor data in that the system 100 leverages the temporal structure in sensor data by deploying a higher-order deep Markov model. The temporal sequences are a series of measurements associated with a particular component (or a particular part) processed at a set of given stations through time. The system 100 utilizes past measurements for a given part, as well as past measurements at each station, to learn the temporal sequence representation, thereby being effective in predicting future measurements.

The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 includes random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a predictive measurement program 130, a machine learning system 140, machine learning data 150, and other relevant data 160, which are stored thereon. The predictive measurement program 130 includes computer readable data with instructions, which, when executed by the processing system 110, is configured to train and/or employ the machine learning system 140 to learn to generate future measurement data, which also may be referred to as predicted measurement data. The computer readable data can include instructions, code, routines, various related data, any software technology, or any number and combination thereof. In an example embodiment, the machine learning system 140 includes a deep Markov-based model. Also, the machine learning data 150 includes various data relating to the machine learning system 140. The machine learning data 150 includes various data associated with training and/or employing the machine learning system 140. For instance, the machine learning data 150 may include training data, various parameter data, various loss data, etc. Meanwhile, the other relevant data 160 provides various data (e.g. operating system, etc.), which enables the system 100 to perform the functions as discussed herein.

The system 100 is configured to include one or more sensor systems 170. The sensor system 170 includes one or more sensors. For example, the sensor system 170 may include an image sensor, a camera, a radar sensor, a light detection and ranging (LIDAR) sensor, a structured light sensor, a thermal sensor, a depth sensor, an ultrasonic sensor, an infrared sensor, a motion sensor, an audio sensor (e.g., microphone), a weight sensor, a pressure sensor, any applicable sensor, or any number and combination thereof. The sensor system 170 is operable to communicate with one or more other components (e.g., processing system 110 and memory system 120) of the system 100. For example, upon receiving sensor data from a sensor system 170, the sensor system 170 and/or the processing system 110 may generate sensor-fusion data. If needed, the processing system 110 may perform one or more data preparation operations to the sensor data and/or sensor-fusion data to provide input data (e.g., observed measurement data) of suitable form (e.g., numerical data) for the machine learning system 140. The sensor system 170 is local, remote, or a combination thereof (e.g., partly local and partly remote). The sensor system 170 may include one or more sensors at one or more of the stations of a given station sequence that a given part traverses. Additionally or alternatively, there may be one or more sensor systems 170 at each station of the station sequence that a given part traverses. Upon receiving the sensor data, the processing system 110 is configured to process this sensor data in connection with the predictive measurement program 130, the machine learning system 140, the machine learning data 150, the other relevant data 160, or any number and combination thereof.

In addition, the system 100 may include at least one other system component. For example, as shown in FIG. 1, the memory system 120 is also configured to store other relevant data 160, which relates to operation of the system 100 in relation to one or more system components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology (e.g. wired communication technology, wireless communication technology, or a combination thereof) that enables system components of the system 100 to communicate with each other as described herein.

Figure 2:
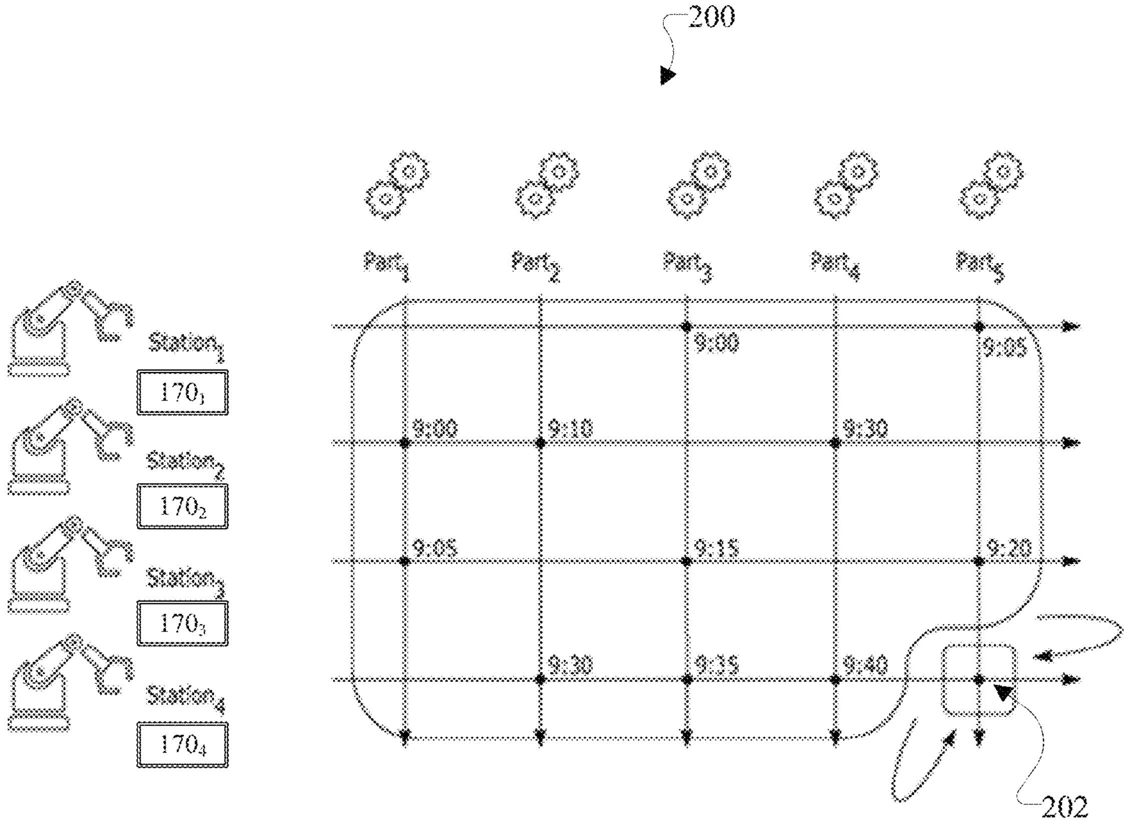
FIG. 2 is diagram of a non-limiting example of an application of the system of FIG. 1 according to an example embodiment of this disclosure.

FIG. 2 is a non-limiting example of a graphical representation 200 of a time-ordered, directed graph model. More specifically, in this graphical representation 200, each black circle denotes multimodal measurement data or records associated with a particular part in relation to a particular station. Each black circle is also provided with a time stamp, indicating a time in which a particular part is measured by sensor system 170; at a particular station, where i represents an integer value greater than one. For instance, this graphical representation 200 captures the following measurement events: part1 is measured by one or more sensors of sensor system 1702 at station2 at 9:00, and measured by one or more sensors of sensor system 1703 at station3 at 9:05; part2 is measured by one or more sensors of sensor system 1702 at station2 at 9:10, and measured by one or more sensors of sensor system 1704 at station4 at 9:30; part3 is measured by one or more sensors of sensor system 1701 at station1 at 9:00, measured by one or more sensors of sensor system 1703 at station3 at 9:15, and measured by one or more sensors of sensor system 1704 at station4 at 9:35; part4 is measured by one or more sensors of sensor system 1702 at station2 at 9:30 and measured by one or more sensors of sensor system 1704 at station4 at 9:40; part5 is measured by one or more sensors of sensor system 1701 at station1 at 9:05 and measured by one or more sensors of sensor system 1703 at station3 at 9:20. In this regard, part5 has passed through the station subsequence of station1 and station3 and further needs to pass through station4 to complete the established station sequence of station1, station3, and station4.

In FIG. 2, the graphical representation 200 illustrates non-limiting examples of measurement data collection at an assembly plant. Other non-limiting examples may include more or less than five parts and/or more or less than four stations. The arrows in the graph show the time progression for each part (going top to bottom), and for each station (going left to right). In addition, the graphical representation 200 includes an irregular shape around previous measurement events to indicate history measurement data and/or observed measurement data, which have been captured by the system 100 prior to this given instance. The graphical representation 200 also includes a rectangular shape around the black circle at the intersection of part5 and station4 to denote an example of missing information or unavailable information at this given instance. Alternatively to the above scenario, there may be observed measurement data associated with part5 at station4, wherein the system 100 is requested to generate this predicted measurement data in order to compare the observed measurement data with the predicted measurement data, which is an estimation for that given part at that given station based on history information of those stations and observed measurement data for that given part at previous stations.

As shown in FIG. 2, the manufacturing process associated with part5 includes a station sequence of station1, station3, and station4. More specifically, the system 100 is configured to provide a relatively accurate prediction or estimation of the target data 202 (e.g., measurement data or record) without having to directly perform actual measurements of part5 at station4 at that given instance. Also, the system 100 is configured to generate this prediction or estimation of the target data 202 when the part5 is at station3 (i.e., before part5 even arrives at station4). The system 100 is configured to predict the measurements or records for part5 with respect to station4 given the past representations. For example, in this case, the machine learning system 140 generates predicted measurement data for part5 at station4 based on observed measurement data of part5 taken at station1, observed measurement data of part5 taken at station3, history measurement data of part3 at station1, history measurement data of part3 at station3, history measurement data of part1 at station3, history measurement data of part4 at station4 and history measurement data of part3 at station4 (when taken with respect to previous steps such that m=2). This is advantageous as part5 may be prevented from advancing to station4 if the system 100 generates predicted measurement data, which is deemed to be at an unsatisfactory level. To generate this predicted measurement data, the system 100 includes the machine learning system 140, as discussed below.

Figure 3:
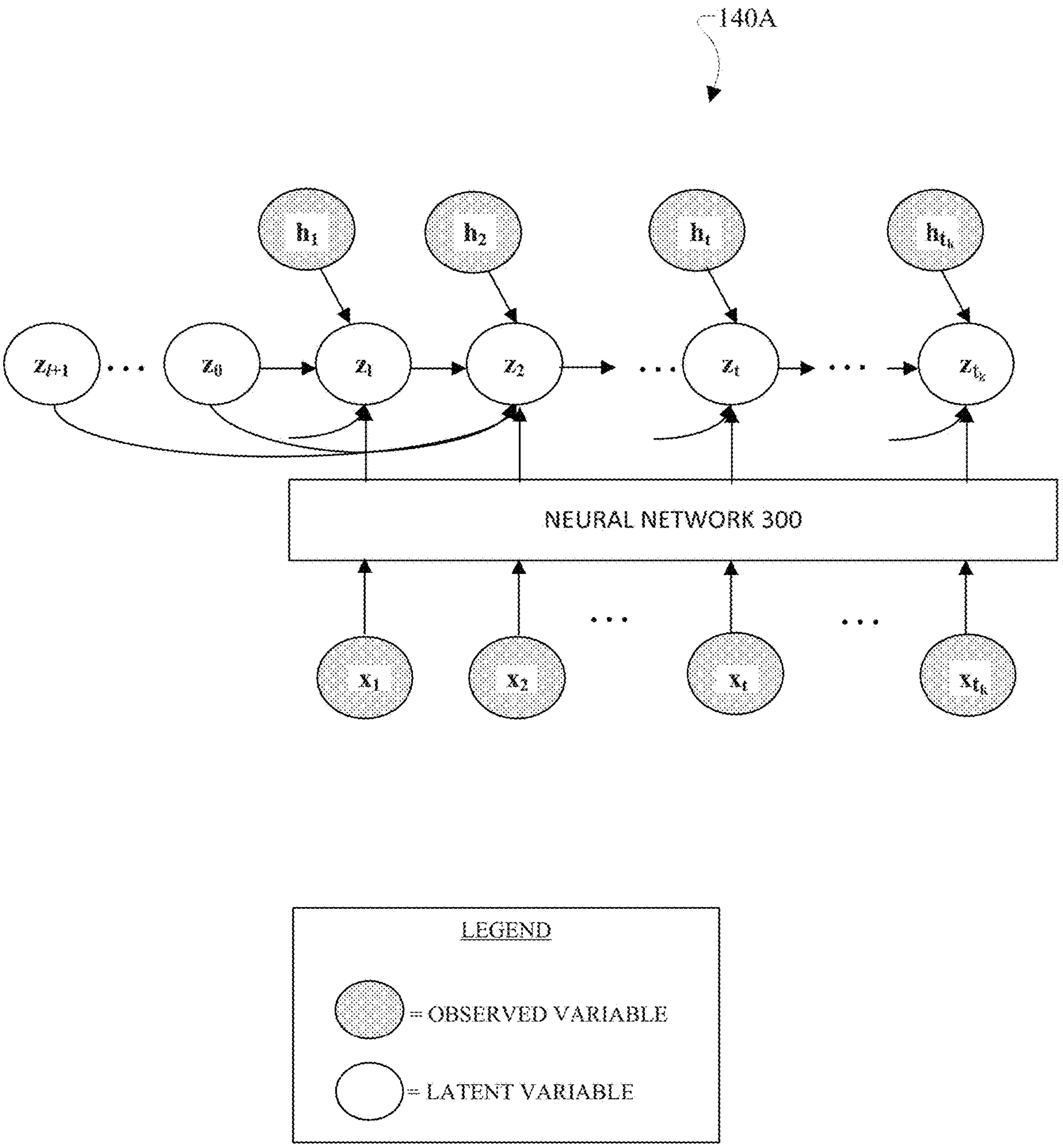
FIG. 3 is diagram of an example of an inference model of the machine learning system of FIG. 1 according to an example embodiment of this disclosure.
Figure 4:
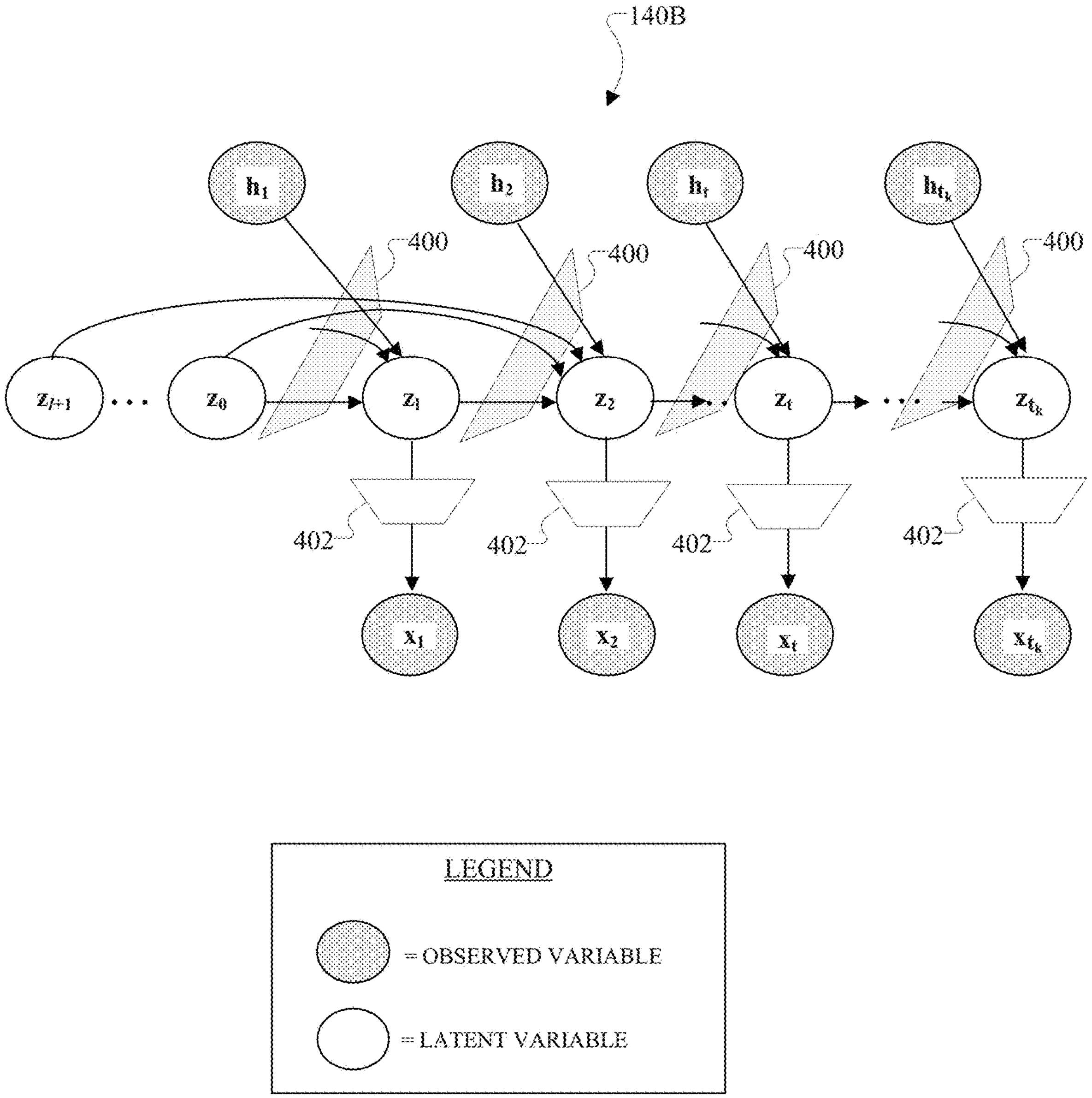
FIG. 4 is diagram of an example of a generative model of the machine learning system of FIG. 1 according to an example embodiment of this disclosure.

FIG. 3 and FIG. 4 are diagrams of an example of a machine learning system 140 according to an example embodiment. The machine learning model is configured to predict a future measurement data for a particular part at a given station. The future measurement may also be referred to as the predicted measurement data. To generate the predicted measurement for a particular part at a given station, the machine learning system 140 uses that part's measurement data at previous stations, as well as the history of measurement data that was performed by one or more other parts at that given station. The machine learning system 140 is an Eth order deep Markov model (i.e., a model order $\ell$) The machine learning system 140 includes an inference model 140A (FIG. 3) and a generative model 140B (FIG. 4), which are trained together. As shown in FIG. 3 and FIG. 4, the inference model 140A includes neural network 300 while the generative model 140B includes neural network 400 and neural network 402.

For the machine learning system 140, the system 100 arranges various data as a collection of part-view trajectories/paths $(\tau_k))_{k\in\mathcal{K}}$. Each path $\tau_k$ is a sequence of sparse multimodal structural measurements collected at a particular station over time for a specific part alongside the history measurements at that station, i.e., $\tau=((x_1, h_1), \ldots, (x_{t_x},h_{t_x}))$. The sparse part measurement $x\in\mathbb{R}^D$ is a vector that can only be evaluated at specific indices corresponding to the type of measurements collected at that particular station. The sparse history measurement $h\in\mathbb{R}^{D\times M}$ is the succession of M previous measurements at each station. D is the number of all the possible measurements that can be collected at all the stations.

The measurements and/or the measurement data may be a binary value, a strength value, a time series value (e.g., a measurement of the response to pressure), floating precision number, number string, integer, Boolean, aggregation of statistics, or the like which provides attribute information of the part. The measurement data may be based on raw sensor data from one or more sensors at a station, sensor-fusion data from sensors at a station, or any number and combination thereof. The raw sensor data may include image data, video data, audio data, text data, alphanumeric data, or any number and combination thereof. The processing system 110 is configured to perform one or more data preparation operations on the raw sensor data to provide measurement data as input to the machine learning system 140.

The machine learning system 140 is to learn a probability distribution of future measurements given past measurements to be then used for prediction/estimation of the future measurement values. Assuming first-order Markovian dependency among part-view measurements, the joint probability of measurements, given history measurements at each station. $((x_1,h_1), \ldots, (x_t,h_t), \ldots, (x_{t_k},h_{t_k}))$ can be expressed as a factorized distribution over part (x) and history (h) measurements, as expressed in equation 1. In this regard, the machine learning system 140 extends the first-order assumption and deploys a higher-order temporal dependency using a deep Markov model.

$$p(x|h) = \prod_{t=1}^{t_k} p(x_t|h_t, x_{t-1}) \qquad [1]$$

Also, to learn the probability distribution over the measurement variables, the system 100 defines a low-dimensional representation of the measurement data that depends on the history measurement data and observed measurement data of the given part. The representations to be learned are defined as a set of latent variables $z_t$. More specifically, in FIG. 3 and FIG. 4, the latent variable at each step t is assumed to be dependent on the combination of $\ell$ past latent variables $(z_{t-1}, \ldots, z_{t-\ell})$ representing the part measurements $x_{t-1}$ through $x_{t-\ell}$ and history measurement $h_t$. The observed measurement data at step t is dependent on the latent variable through an emission deep neural network. The joint probability distribution of measurements in a part-view sequence is given by the generative process of the deep Markov model, as shown in FIG. 4 and expressed in equation 2.

$$p(x|h) = \int_z \prod_{t=1}^{t_k} p(x_t|z_t)p(z_t|z_{t-1:t-\ell}, h_t) \qquad [2]$$

To predict a future measurement for a particular part at a given station, the machine learning system 140 uses the part's measurements at previous stations as well as the history of measurements that have been performed by one or more other parts at least at that given station. More specifically, the machine learning system 140 handles input data relating to a set of part-view sequences. A part-view sequence is representative of a part traversing along a trajectory of stations $\mathcal{K} \in \{1, \ldots, K\}$. The input data includes a list of D dimensional measurements $[x_1, \ldots, x_{t_k}]$ for each sequence $k \in \mathcal{K}$ of length $t_k$, $x \in \mathbb{R}^D$. The input data includes history measurements for the past m steps for each station in the sequence $[h_1, \ldots, h_{t_k}]$ for each sequence $k \in \mathcal{K}$.

For the next time point prediction, the processing system 110 evaluates the probability distribution expressed below in equation 3. In equation 3, the three distributions on the right-hand side are parameterized and learned by neural networks, and the integral is estimated by Monte Carlo samples. Each of the three distributions on the right-hand side of equation 3 is a Gaussian distribution, where its mean and variance are parameterized by neural networks. The posterior $q(z_{t:t+1-\ell}|x_{1:t})$ is parameterized by neural network 300. The neural network 300 comprises a long short-term memory (LSTM) network, a temporal convolutional network (TCN), or any applicable machine learning network, which takes in previous measurements and outputs the posterior mean and variance of the latent variables. The prior $p(z_{t+1}|z_{t:t+1-\ell}, h_{t+1})$ is parameterized by neural network 400. The neural network 400 takes in history measurements and previous latent values and outputs the prior mean and variance of latent variable $z_{t+1}$. The predictive distribution $p(x_{t+1}|z_{t+1})$ is also parameterized by neural network 402, which takes in corresponding latent variable $z_{t+1}$ and predicts the next time point measurement $x_{t+1}$. Also, in equation 3, each integral is an expectation that may be replaced with appropriate sampling and summation.

$$p(x_{t+1}|x_{1:t}) = \int_{z_{t+1-\ell:t}} p(x_{t+1}|z_{t+1})p(z_{t+1}|z_{t:t+1-\ell}, h_{t+1})q(z_{t:t+1-\ell}|x_{1:t}) \qquad [3]$$

Referring to FIG. 3, the observed measurements $x_{1:t}$ go through the neural network 300, parameterizing the posterior $q(z_{t:t+1-\ell}|x_{1:t})$, as discussed above. In addition, the neural network 300 outputs the posterior mean and variance of the latent variables $z_{t:t+1-\ell}$. Also, as shown in FIG. 4, the latent variables $z_{t:t+1-\ell}$ and history measurements $h_{t+1}$ go through neural network 400 parameterizing the prior $p(z_{t+1}|z_{t:t+1-\ell}, h_{t+1})$. The neural network 400 comprises a multilayer perceptron (MLP) network or any applicable machine learning network. For instance, in FIG. 4, the neural network 400 comprises an MLP network, which includes an MLP for each latent variable. The neural network 400 takes in history measurements and previous latent values. The neural network 400 outputs the prior mean and variance of latent variable $z_{t+1}$. Also, in FIG. 4, the generative model 140B includes neural network 402. The neural network 402 comprises an MLP network or any applicable machine learning network. For instance, in FIG. 4, the neural network 402 comprises an MLP network, which includes an MLP for each latent variable. As shown in the example of FIG. 4, the MLP network includes an MLP, which takes in the corresponding latent variable $z_{t+1}$ and predicts $x_{t+1}$. The predicted measurement data $x_{t+1}$ is predicted by $p(x_{t+1}|z_{t+1})$, which corresponds to neural network 402 (e.g., the MLP between a node for $z_{t+1}$ and a node for $x_{t+1}$).

As an illustrative example, referring to FIG. 2, when generating predicted measurement data for part5 at station4, as aforementioned, the machine learning system 140 generates predicted measurement data for part5 at station4 based on observed measurement data of part5 taken at station1, observed measurement data of part5 taken at station3, history measurement data of part3 at station1, history measurement data of part3 at station3, history measurement data of part1 at station3, history measurement data of part4 at station4 and history measurement data of part3 at station4 (when taken with respect to previous steps such that m=2). In this example, the node $x_1$ may represent the observed measurement data of part5 at station1, node $x_2$ (i.e., node $x_t$ where t=2) may represent the observed measurement data of part5 at station3, and node $x_3$ may represent a "next node" (i.e. node $x_{t+1}$) associated with a "next latent variable" (i.e. node $z_{t+1}$) corresponding to station4 of a station sequence that includes station1, station3, and station4. In this case, the station subsequence includes station1 and station3. Also, when m=2, then node $h_1$ may represent history measurement data of part3 at station1. For m=2, node $h_2$ may represent a concatenation of the history measurement data of part3 at station3 and a history measurement data of part1 at station3. For m=2, node $h_3$ may represent a concatenation of the history measurement data of part4 at station4 and a history measurement data of part3 at station4. Also, as shown in FIG. 3 and FIG. 4, the node $z_2$ receives input from $z_{l+1}, \ldots, z_0$, and $z_1$, together with input from node $h_2$. Node $z_3$ receives input from $z_{l+1}, \ldots, z_0, z_1$, and $z_2$ together with input from node $h_3$. Accordingly, in this example, for given part5, the machine learning system 140 is configured to generate predicted measurement data for node $x_{t+1}$ (i.e., node $x_3$ associated with station4) based on node $h_3$ and a set of parameter data ("next parameter data" that includes mean and variance) associated with node $z_{t+1}$, which represents the next latent variable.

As described in this disclosure, the system 100 provides several advantages and benefits. For example, the system 100 models manufacturing sensor data and provides valuable insight into a manufacturing process. Also, the machine learning system 140 is a robust predictive model, which is based on sensor time series data for forecasting and which may alleviate the need for performing expensive and time-consuming measurements at a given instance. The machine learning system 140 is advantageous in being configured to incorporate long-range temporal dependencies.

The machine learning system 140 is configured to generate predicted measurement data, which may be used in various downstream tasks, e.g., predictive monitoring, predictive maintenance, etc. Such predictive measurements of the manufactured part along the manufacturing line can reduce costs associated with scrapping a component or a part. If a measurement of a component or a part can be estimated within the manufacturing line (e.g., at or between every manufacturing station), this can lead to a more precise determination of when a failure or misstep in manufacturing takes place. The observed measurement data and the predicted measurement data provide users with the insight, for example, to scrap a component or a part at any time in the manufacturing process before such action becomes more expensive to do so. Also, depending on the measurement data taken at a particular station and/or predicted by the machine learning system 140 for that station, the system 100 may determine if there are any issues or potential issues that need to be addressed with respect to one or more of the industrial machines at that station, one or more sensors taking measurements at that station, one or more parts traversing through that station, or any number and combination thereof, thereby providing users with the insight to take various actions (e.g., preventative actions, maintenance actions, etc.) that benefit manufacturing processes.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for predictive measurement monitoring, the method comprising:

establishing a station sequence that includes a plurality of stations that a given part traverses;

receiving, via an inference model of a machine learning model, observed measurement data relating to attributes of the given part as obtained by one or more sensors at each station of a station subsequence of the station sequence;

generating, via the inference model, a set of parameter data based on the observed measurement data, the set of parameter data being associated with a latent variable subsequence, the latent variable subsequence corresponding to the station subsequence;

receiving, via a generative model of the machine learning model, history measurement data of another part that was processed before the given part, the history measurement data relating to attributes of the another part that are taken with respect to each station of the plurality of stations of the station sequence;

generating, via the generative model, next parameter data based on the history measurement data while using the set of parameter data, the next parameter data being associated with a next latent variable that follows the latent variable subsequence, the next latent variable corresponding to a next station that follows the station subsequence in the station sequence; and generating, via the generative model, predicted measurement data of the given part at the next station based on the next latent variable and the next parameter data, wherein, the inference model defines a posterior distribution based on the observed measurement data, the generative model is conditioned on the posterior distribution to generate the predicted measurement data, and the machine learning model extends a first-order temporal dependency to learn a higher-order temporal dependency with respect to the observed measurement data when generating the predicted measurement data.

2. The computer-implemented method of claim 1, wherein the inference model includes a long short-term memory (LSTM) or a temporal convolutional network (TCN) that generates the set of parameter data.

3. The computer-implemented method of claim 1, wherein:

the generative model includes a first multi-layer perceptron network that generates the next parameter data; and the generative model includes a second multi-layer perceptron network that generates the predicted measurement data.

4. The computer-implemented method of claim 1, wherein:

the inference model and the generative model are trained together.

5. The computer-implemented method of claim 1, wherein the set of parameter data includes a posterior mean and a posterior variance associated with each latent variable of the latent variable subsequence.

6. The computer-implemented method of claim 1, wherein the next parameter data includes a prior mean and a prior variance associated with the next latent variable.

7. The computer-implemented method of claim 1, wherein:

the observed measurement data is based on multimodal sensor data;

the history measurement data is based on multimodal sensor data; and the predicted measurement data is based on multimodal sensor data.

8. A system comprising:

a processor; and a memory in data communication with the processor, the memory having computer readable data including instructions stored thereon that, when executed by the processor, cause the processor to perform a method for predictive measurement monitoring, the method including:

establishing a station sequence that includes a plurality of stations that a given part traverses;

receiving, via an inference model of a machine learning model, observed measurement data relating to attributes of the given part as obtained by one or more sensors at each station of a station subsequence of the station sequence;

generating, via the inference model, a set of parameter data based on the observed measurement data, the set of parameter data being associated with a latent variable subsequence, the latent variable subsequence corresponding to the station subsequence;

receiving, via a generative model of the machine learning model, history measurement data of another part that was processed before the given part, the history measurement data relating to attributes of the another part that are taken with respect to each station of the plurality of stations of the station sequence;

generating, via the generative model, next parameter data based on the history measurement data while using the set of parameter data, the next parameter data being associated with a next latent variable that follows the latent variable subsequence, the next latent variable corresponding to a next station that follows the station subsequence in the station sequence; and generating, via the generative model, predicted measurement data of the given part at the next station based on the next latent variable and the next parameter data, wherein, the inference model defines a posterior distribution based on the observed measurement data, the generative model is conditioned on the posterior distribution to generate the predicted measurement data, and the machine learning model extends a first-order temporal dependency to learn a higher-order temporal dependency with respect to the observed measurement data when generating the predicted measurement data.

9. The system of claim 8, wherein the inference model includes a long short-term memory (LSTM) or a temporal convolutional network (TCN) that generates the set of parameter data.

10. The system of claim 8, wherein:

the generative model includes a first multi-layer perceptron network that generates the next parameter data; and the generative model includes a second multi-layer perceptron network that generates the predicted measurement data.

11. The system of claim 8, wherein:

the inference model and the generative model are trained together.

12. The system of claim 8, wherein the set of parameter data includes a posterior mean and a posterior variance associated with each latent variable of the latent variable subsequence.

13. The system of claim 8, wherein the next parameter data includes a prior mean and a prior variance associated with the next latent variable.

14. The system of claim 8, wherein:

the set of observed measurement data is based on multimodal sensor data;

the set of history measurement data is based on multimodal sensor data; and the predicted measurement data is based on multimodal sensor data.

15. A non-transitory computer readable medium having computer readable data including instructions stored thereon that, when executed by a processor, cause the processor to perform a method for predictive measurement monitoring, the method including:

establishing a station sequence that includes a plurality of stations that a given part traverses;

receiving, via an inference model of a machine learning model, observed measurement data regarding attributes of the given part as obtained by one or more sensors at each station of a station subsequence of the station sequence;

generating, via the inference model, a set of parameter data based on the observed measurement data, the set of parameter data being associated with a latent variable subsequence, the latent variable subsequence corresponding to the station subsequence;

receiving, via a generative model of the machine learning model, history measurement data of another part that was processed before the given part, the history measurement data regarding attributes of the another part that are taken with respect to each station of the plurality of stations of the station sequence;

generating, via the generative model, next parameter data based on the history measurement data while using the set of parameter data, the next parameter data being associated with a next latent variable that follows the latent variable subsequence, the next latent variable corresponding to a next station that follows the station subsequence in the station sequence; and generating, via the generative model, predicted measurement data of the given part at the next station based on the next latent variable and the next parameter data, wherein, the inference model defines a posterior distribution based on the observed measurement data, the generative model is conditioned on the posterior distribution to generate the predicted measurement data, and the machine learning model extends a first-order temporal dependency to learn a higher-order temporal dependency with respect to the observed measurement data when generating the predicted measurement data.

16. The non-transitory computer readable medium of claim 15, wherein the inference model includes a long short-term memory (LSTM) or a temporal convolutional network (TCN) that generates the set of parameter data.

17. The non-transitory computer readable medium of claim 15, wherein:

the generative model includes a first multi-layer perceptron network that generates the next parameter data; and the generative model includes a second multi-layer perceptron network that generates the predicted measurement data.

18. The non-transitory computer readable medium of claim 15, wherein:

the inference model and the generative model are trained together.

19. The non-transitory computer readable medium of claim 15, wherein the set of parameter data includes a posterior mean and a posterior variance associated with each latent variable of the latent variable subsequence.

20. The non-transitory computer readable medium of claim 15, wherein the next parameter data includes a prior mean and a prior variance associated with the next latent variable.

* * * * *